United States Patent Office 3,679,612
Patented July 25, 1972

3,679,612
DECORATIVE COMPOSITION AND PROCESS
FOR PREPARING SAME
Witold Titow, Chessington, Surrey, England, assignor to
Molins Limited, London, England
No Drawing. Continuation of application Ser. No.
598,953, Dec. 5, 1966. This application Sept. 23,
1970, Ser. No. 74,922
Claims priority, application Great Britain, Dec. 13, 1965,
52,818/65
Int. Cl. G03g 9/02; C08f 47/20
U.S. Cl. 260—2
26 Claims

ABSTRACT OF THE DISCLOSURE

This specification describes novel, dry particulate inks of substantially spherical shape which are composed of a polymeric binder, a colorant and a filler which is present to give the inks improved transfer characteristics when used in electrostatic printing. The inks may be produced by dispersing a solution of the ink composition (binder, colorant, filler plus any other additives) in another liquid and then evaporating off the binder solvent to form a suspension of the ink particles in the liquid. A melt of the ink composition may be used instead of a solution.

THE INVENTION

This is a continuation application of my copending application Ser. No. 598,953, filed Dec. 5, 1966 (now abandoned).

This invention relates to a novel dry decorative composition, particularly dry particulate powder inks, for use in electrostatic printing and also to a novel process for preparing same.

The dry particulate ink (or toner) compositions used in electrostatic decorating or printing typically comprise a polymeric binder or resinous material, such as a thermoplastic or thermosetting resin. In the course of the printing operation, the resinous material is fused or sintered (usually by the action of heat or externally applied solvent vapours) to a transfer sheet, e.g. such as a sheet of paper or glass surface, to produce an image in the form of an adherent film on the substrate. This film should, for reasons of permanency, be resistant to the action of atmospheric or mechanical influences including moisture, abrasion and scuffing.

In addition to the polymeric binder or resinous material, the decorative composition usually comprises other selected ingredients including colorants and fillers. The polymeric binder material serves as a vehicle for the colorant, the latter typically constituting up to about 20% of the total weight of the ink. Such colorant(s) may be an insoluble pigment or dye which is soluble in the binder. One pigment which is frequently used is carbon black. Since carbon black has a density of about the same order as that of most of the commercially used polymeric binders, it does not significantly alter the density of the ink particles. Carbon black will however, tend to modify the surface and volume resistivity of the binder material. The filler(s) is incorporated in the decorative composition to modify the specific gravity thereof.

The particulate decorative compositions are typically prepared by mechanical comminution of resinous binder/colorant mixtures, followed by grading of the resulting particulate material, for example, by sieving or elutriation. In this method, complete encapsulation of insoluble colorants by the polymeric binder is not, in general, achieved and furthermore, the particles are irregular in shape. The necessity to grade the inks results in wastage of material since it is quite usual for the particles in the desired size range, as recovered by grading procedures, to comprise only about 20% of the comminuted composition. With thermoplastic binders, or thermosetting binders which cure at relatively low temperatures, it may even be necessary to take special precautions such as freezing the material to prevent fusion or curing of the binder at this stage.

In accordance with this invention, there is provided a process for preparing dry particulate, substantially spherical ink particles having a very uniform particle size.

More particularly, there is provided a process wherein a particulate ink composition comprising a polymeric binder, colorant, and other selected additives, is dispersed in the liquid state in an inert suspending liquid, solidified, and then recovered from the liquid. The dispersed particles which are recovered from the suspending liquid have been discovered to be uniform in size and substantially spherical in shape.

Thus, this invention comprises a process for dispersing the ink composition in the liquid state in an inert suspending liquid to form a suspension of the ink composition in the inert liquid and subsequently recovering the ink particles from the suspension by solidifying the ink composition and separating it from the inert suspending liquid.

The recovered ink particles are generally spherical particles of uniform particle size and may contain, as noted hereinbefore, in addition to the resinous binder and colorant, quantities of an inert filler to increase the specific bulk density of the particles and to improve the transfer properties of the particles during the printing process.

In a further embodiment of this invention, there is prepared a solution by dissolving the binder in a solvent and dispersing the colorant pigment and filler (if present) therein. The solution is then dispersed in the inert liquid to form a suspension in the liquid. The binder solvent is removed from the dispersion, suitably by evaporation, to leave behind a suspension of ink particles in the inert liquid.

It is contemplated in the practice of this invention that the particles can be separated from the inert liquid by any suitable method, such as decantation, filtration or centrifugation, and washed and dried as desired. Spray drying has been found to be a very suitable drying method.

In the specific practice of this invention, the resinous binder is dissolved in a solvent and the colorant and filler (if any) are thoroughly dispersed in this solution. If the colorant is a dyestuff then it will dissolve at this stage and be intermixed with the polymer; the filler should be dispersed down to the individual particle stage so that no aggregates or agglomerates remain in the solution. If necessary, the dispersion is continuously stirred to ensure that it remains uniform and no sedimentation occurs before the next step. The suspension of the filler and colorant in the binder solution is then introduced with suitable agitation (such as, for example, stirring) into a volume of an inert liquid which is substantially immiscible with the binder solution. The volume of the inert liquid will normally be greater than the volume of the binder solution by a factor of at least five or more. Typical inert liquids suitable for use with many binder compositions include glycerol and water. The object of this step is to produce a suspension or emulsion of the binder solution (carrying the colorant, filler and any other additives) in the inert liquid. The particle size of this suspension should be such as to give the required particle size of ink recovered from the inert liquid.

The size of the globules of the ink solution in the inert liquid may be varied by suitable adjustment of several operational factors, the significance and role of which will be clear to those skilled in the art.

(a) The nature and conditions of operation of the agitator used for dispersing the ink composition in the inert liquid. Thus, if a stirrer (suitably of the impeller type) is used, its speed, depth of immersion and its size relative to the size of the vessel may be adjusted. Furthermore a colloidal mill or ultrasonic mixer may be used as predisperser, or as the main disperser instead of a stirrer (especially when very fine particle inks are required).

(b) The mode of introduction of the solution into the inert liquid. For example, the solution may be predispersed (e.g. by means of a colloid mill or ultrasonic mixer) or may be poured straight into the inert liquid at various rates.

(c) The use of surface active agents, either in the inert liquid or the binder solution.

(d) The viscosity of the inert liquid in relation to that of the binder solution. The viscosity of the inert liquid may suitably be varied by the addition of thickening agents.

The inert liquid, apart from being substantially immiscible with the binder solution, should also preferably have a boiling point higher than that of the solvent used to produce the solution, or at least it should not have a high evaporation rate at the lowest temperature at which the evaporation rate of the solvent is substantial. Glycerol has been successfully used with binder solutions in aromatic hydrocarbons such as toluene or xylene, mixtures of aromatic hydrocarbons, mixtures of aromatic hydrocarbons with alcohols such as butanol, or ketones such as methyl ethyl ketone (MEK). Water, containing up to 6% of a thickener, such as polyvinyl alcohol or carboxymethyl cellulose, has been successfully used with binder solutions in such solvents as methylene chloride, chloroform and a mixture of butanol and xylene.

After the introduction of the binder solution into the inert liquid, and its dispersion in the liquid into droplets of the desired size, the agitation is maintained and the suspending liquid is heated to a temperature at which evaporation of the solvent from the binder solution takes place. Agitation is maintained until all the solvent has been removed, which may be detected by the absence of solvent smell. At this stage the particulate phase of the suspension will consist of substantially spherical particles of the resinous binder incorporating and enveloping the colorant and filler present and any other components of the ink. The suspension is then cooled with continual agitation, diluted if necessary, and the particles are separated from the suspending liquid and dried.

When aqueous solutions of thickening agents are used as the suspending liquid the suspension may be diluted repeatedly in order to wash the ink particles. However, it is also practicable to leave some thickening agent in the suspension, so that when the ink particles are subsequently separated therefrom and dried, a thin film of the thickening agent will form, and remain, on the surface of the ink particles. As these agents are normally hydrophylic materials with polar groups the presence of the surface film can have an appreciable effect on the surface resistivity of the ink particles. If it is desired to deposit any other compounds on the particle surface to modify the surface characteristics of the ink, they can conveniently be added to the suspension immediately prior to the recovery of the particles which would, in this case, be preceded by stirring to ensure the even distribution of the compound over the particles. Antistatic agents can readily be coated on to the ink particles in this way. In order to economise on the modifying agent, it is possible to remove most of the liquid from the diluted suspension before adding the agent. The surface treatment with the modifying agent may be combined with the deposition of a thin film of the thickening agent as above described.

The inks treated in this way are therefore, particles, generally of a substantially spherical shape, carrying on their surface a coating of a material which modifies their surface properties.

The ink particles may be recovered from the suspension after the above step by any convenient method. A convenient method is spray-drying which separates and dries the ink particles in a single operation.

The process produces inks of uniform particle size and substantially spherical particle shape with the binder completely encapsulating any other constituents (filler, insoluble pigments, flow promoters etc.); in the case of fillers of very small particle size, for example titanium dioxide, several filler particles may be contained in one ink particle.

In accordance with a further embodiment of this invention, there is used a melt of the resinous binder instead of a solution prepared with a solvent. In such embodiment the colorant, filler and other additives (when present) are dissolved or dispersed in the polymeric binder, such that when the latter is melted the former are evenly distributed throughout the melt without agglomerates or aggregates. The melt is then introduced into the suspending liquid with agitation. Preferably the suspending liquid is heated, before the introduction of the melt, to a temperature sufficiently high to maintain the binder in the molten state. The suspending liquid is then cooled down after a suitable time, while maintaining the agitation. There is, of course, no solvent to be removed from the binder. Other general features and steps in this embodiment are similar to, or identical with, those in the solution embodiment.

In addition to the binder, colorant and filler (if present), the ink composition may also contain other additives such as antistatic agents to reduce the build-up of tribo-electric charges on the particles and dry flow promoters to improve the handling characteristics of the ink. These latter ingredients are generally present to the extent of up to 20% and up to 10% by weight on the total weight of the composition respectively. If the antistatic agent is deposited on the surface of the ink as described above it will generally constitute up to only 5% of the total weight of the ink composition.

The contemplated proportions for the typical constituents in the ink composition are summarized in Table I.

Table I

| | Percent by weight |
|---|---|
| Polymeric binder (thermoplastic or thermosetting, in the latter case including any curing agents) | 40–90 |
| Colorant (insoluble pigment or soluble dye) | 0–20 |
| Filler (preferably at least 15%) | 0–50 |
| Antistatic agent | [1] 0–20 |
| Other additives (e.g. dry flow promoters) | 0–10 |

[1] about 5% by weight of the total composition, if applied externally.

The resinous binder or polymeric materials contemplated herein include both thermoplastic and thermosetting resins and polymers.

Any suitable resin or polymer (or copolymer) may be used provided it is capable of producing a satisfactory decorative image by the decorating process envisaged. In particular, it must be capable of being fixed to the substrate or surface to be decorated or printed e.g. such as a sheet of paper, cardboard, or glassware. When a heat fixing decorating process is being used, the resin must be capable of being fused or sintered to the surface under the action of the heat.

Similarly, if the decorative or printing composition is to be applied or fixed to the decorable surface or substrate via a so-called solvent vapor process, then the selected resin must be susceptible to the action of the appropriate vapor.

In addition, the selected resin should also form reasonably strong films adherent to the substrate and if the fusion fixing technique is used, it should preferably melt rapidly to melts of low viscosity. Likewise, the resin should have a reasonable shelf-life such that the decorative composition can be safely stored between production and use.

The selection of suitable resins possessing the desired combination of properties is within the skill of those in the art. Many different classes of resin may be employed although it will be understood that not all resins of any one class will necessarily be operable.

Typical thermoplastic resins and polymers suitable for use in the practice of this invention include not by way of limitation commercially available resins such as polyvinyl chloride, polyacrylates, polyvinylidene chloride, polyethylene, polystyrene, copolymer vinyl acetate with ethylene, melamine formaldehyde resins, organopolysiloxane resins, aldehyde resins, ketone resins, and the polyamide type resins. In addition it is contemplated that other resins, non-commercial or commercial, may be used.

It is especially suitable to use polyamide resin(s) in the practice of this invention. Polyamide type resins are generally thought of as condensation products which contain recurring amide groups. Such resins may be formed by means well known in the art, for example by the condensation of diamines with diacids.

Examples of polyamides contemplated in the practice of this invention include not by way of limitation the condensation products of ethylenediamine and sebacic acid, propylenediamine and sebacic acid, tetramethylenediamine and adipic acid, tetramethylenediamine and suberic acid, pentamethylenediamine and malonic acid, pentamethylenediamine and octadecanedioic acid, hexamethylenediamine and adipic acid, octamethylenediamine and sebacic acid, decamethylenediamine and oxalic acid and the like.

Commercially available polyamide resins suitable in the practice of this invention include not by way of limitation polyamide resin Scope 30, which is the resinous derivative of diphenolic acid characterized by a softening temperature of 98° C. to 102° C., an acid value of 3.75 maximum, an amine value of 8.50 maximum, and a specific gravity of 0.99; the thermoplastic resins known commercially as Versalon, for example Versalon 1112 as characterized by a softening temperature of 105° C. to 115° C., a tensile strength of 1900 to 2100 pounds per square inch at 75° F., and a specific gravity of 0.955; and the commercially available polyamide resins known as Polymid 1144 characterized by an acid value of 3.4, an amine value of 4.8, a melting temperature of 99° C. to 104° C., and a specific gravity of 0.99; the polyamide resin Polymid 1155 with an acid value of 5, an amine number of 5, and a specific gravity of 0.98; the polyamide resin Polymid 1060 with an acid value of 4.0, an amine value of 1 to 2, a melting temperature of 112° C. to 113° C., and a specific gravity of 0.97; and the polyamide resin known commercially as Polymid 1074, characterized by an acid value of less than 6, an amine value of less than 6, a melting temperature of 102° C. to 108° C., and a specific gravity of 0.98. Also, other polyamide thermoplastic resins may be used such as Versamid 900 with an amine value of 4, a specific gravity of 0.98, and a softening temperature of 180 to 190° C., and Versamid 950 with an amine value of 4, a specific gravity of 0.98 and a softening temperature of 90 to 100° C.

Scope is a registered trademark for resinous derivatives of diphenolic acid available from S. C. Johnson and Son, Inc., Racine, Wis. Technical bulletins are available which contain additional technical information including physical and chemical properties of the Scope resins and general procedures for preparation. Such bulletins include Technical Bulletins CD-20, Revision 2, issued June 1964, and CD-43, issued April 1963 by the Chemical Division of S. C. Johnson and Son, Inc.

Versalon is a registered trademark for polyamide resins available from General Mills, Inc., Chemical Division, Kankakee, Ill. Technical bulletins published by such company include CDS 4-63 and CDS 5-63, each having an effective date of Nov. 1, 1963, and such being revised on Feb. 1, 1965.

Versamid is a registered trademark for polyamide resins also available from General Mills, Inc., Kankakee, Ill. Technical bulletins published by such company include Versamid Specification Sheet 11, June 1, 1962.

For additional technical information on the General Mills polyamide resins, reference is made to U.S. Letters Pat. 3,224,893, which is incorporated herein by reference.

Generally, the polyamide resins used herein will have an acid value of about 3 to 5, an amine value of about 1 to 8.5, and a specific gravity of about 0.92 to 0.99.

As noted hereinbefore it is contemplated that thermosetting resins may be used as the resinous binder.

The selected thermosetting resin(s) should remain at least partially uncured during the ink preparation. Furthermore, it should be capable of fusion when subjected to heating after deposition on the decorable substrate. It should then fuse rapidly, initially to a low-viscosity melt, and then cure quickly to give an adherent, strong and resistant film. The thermosetting composition(s) will normally consist of the resin(s) and curing agent(s) (possibly prepolymerised to the B-stage) and therefore should have a reasonable shelf life such that the inks can be safely stored between their production and use.

Typical thermosetting resins contemplated herein include not by way of limitation the epoxy resins, epoxy modified resins, phenol/formaldehyde compositions, acrylic resins.

Epoxy resins are characterized by having reactive epoxide groups, oxirane rings

in the resin structure, and are commonly supplied in both liquid and solid form. As used herein the term "epoxy resin" is not to be considered limiting in any manner and is to be considered inclusive of all known epoxy resins since no reason can be advanced at the present time why any epoxy resin should not be operable for the purpose of this invention.

Typical epoxy resins contemplated herein include diglycidyl ether or bisphenol A (and its homologues), glycidyl ethers of glycerol, glycidyl ethers of bisphenol P, glycidyl ethers of a long chain bisphenol glycidyl ethers of tetrakis (hydroxyphenyl) ethane, and epoxylated novolacs. In addition reference is made to the epoxy resins described and set forth in the publication "Epoxy Resins" by Henry Lee and Kris Neville, McGraw-Hill Book Co., Inc. (1957), which are incorporated herein.

One of the characteristic features of the epoxy resins is their inherent ability to transform from a thermoplastic state to a thermoset state. This is typically accomplished by means of a curing or cross-linking agent. The curing agents may be broadly classified as amines, amides, and anhydrides including p,p'-methylene dianiline, hexamethoxy methyl melamine, 3 - isopropylaminopropylamine, 1,2-diaminopropane, meta-xylene diamine, diethylamino-propylamine, diethylene triamine, triethylene diamine, 4-chloro-orthophenylene diamine, phthalic anhydride, dicyandiamide and the like.

Typical commercial epoxy resins contemplated herein include the Epon resins, particularly Epon 1001, 1007, and 820.

Epon is a registered trademark designating various epoxy resins available from The Shell Chemical Company, Plastics and Resins Division, 110 West 51st St., New York, N.Y.

The Epon 1001, 1007 and 820 are epichlorohydrin/bisphenol A-type solid epoxy resins. All possess terminal epoxide groups. The primary difference among the various types is the molecular weight which increases as the identifying number increases.

The chemical structure of a typical molecule of the base resin of Epon 1001, 1007 and 820 is represented by

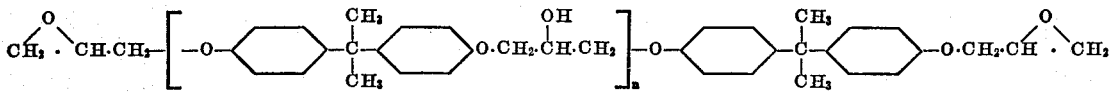

The properties of the Epon 1001, 1007 and 820 are set forth in Table II hereinafter.

TABLE II.—EPON RESINS

| | EPON 1001 | EPON 1007 | EPON 820 |
|---|---|---|---|
| Melting point, °C | 65–75 | 125–135 | (1) |
| Weight per gallon, lbs., 20° C | 2 9.9 | 2 9.6 | 9.7 |
| Refractive index, 25° C | 1.595 | 3 1.598 | 1.565–1.575 |
| Average molecular weight | 900 | 2,900 | 350 |
| Color, 25° C. (Gardner)⁴ | 5 4 | 5 5 | 5 8 |
| Viscosity, 25° C.: | | | |
| Gardner-Holdt | D–G | y–z | |
| Poise⁶ | 1.0–1.7 | 18–28 | 40–100 |
| Epoxide equivalent | 450–550 | 2,000–2,500 | 180–195 |
| Equivalent weight⁸ | 145 | 200 | 85 |
| Hydroxyl content⁹ | 0.28 | 0.36 | 0.06 |

1 Liquid-room temperature.
2 Void free.
3 At 20° C.
4 Using ASTM D1544-58T.
5 Maximum.
6 Bubble-tube method, ASTM 154D, for Epon 1001 and 1007; kinematic viscosity, ASTM D445-53T, for EPON 820.
7 Grams of resin containing one gram-equivalent of epoxide; a-epoxy group content, ASTM D1652-59T.
8 Grams of resin required to esterify completely one gram-mole of monobasic acid, e.g. 280 grams of C₁₈ fatty acid or 60 grams of acetic acid.
9 Equivalent OH/100 grams resin.

Other thermosetting resins contemplated herein include the Acryloid resins, especially the types represented by the acrylic polymer solids which are commercially available in the form of solutions under the designations Acryloid AT–50 and AT–70.

Acryloid is a registered trademark identifying thermosetting acrylic resins (both hydroxyl-functional and carboxyl-functional types) available from the Rohm and Haas Company, Philadelphia, Pa. 19105. Physical and chemical characteristics and properties are given in Rohm and Haas Technical Bulletin C–170–65, published October 1965.

Acryloid AT–50 is a hydroxyl-functional type thermosetting acrylic resin having a viscosity of 625–1755 centipoises at 25° C., a color of 50 max. (ASTM D1544–58T), and a weight per gallon of 8.4 pounds.

Acryloid AT–70 is a carboxyl-functional type thermosetting acrylic resin having a viscosity of 1200–2500 centipoises at 25° C., a color of 50 max., and a weight per gallon of 8.4 pounds.

The colorants contemplated herein may be colored or colorless, inorganic or organic, and soluble or insoluble.

Typical inorganic colorants include lithopones, chrome green, vermillion, iron blues, and the like.

Typical organic colorants that are contemplated herein may be chemically classified as nitro, azo, diazo, nitroso, isonitroso, oxyketone, ketonimides, hydrazides, triphenylamines, azines, quinolines, acridine, indanthrene, and phthalocyamine including anthosine, benzidine yellow, eosine, rose bengal, Hanse yellow, lithol red, methyl red, and peacock blue.

Examples of suitable commercially available insoluble colorants include Watchung Red B (Du Pont trademark) and Rubine Toner B (trademark of I.C.I. Ltd.). Suitable commercial soluble colorants include Waxoline Red OS (I.C.I. Ltd.) and Oracet Red 3R (Ciba Ltd.).

The principal function of the particulate fillers is to increase the specific gravity of the decorative particles, and by so doing, greatly improve the transfer characteristics of the decorative composition. In order to obtain a useful increase in specific gravity I have found it desirable that the filler should have a specific gravity at least twice, and preferably at least four times that, of the binder. Most binders suitable for use in the decorative compositions have a specific gravity of about 1 and therefore the filler will usually have a specific gravity of at least about 2. Silica has a specific gravity of about 2.6 and may thus be used as a filler with suitable resins; titanium dioxide has a specific gravity of about 4.3 and is thus one of the preferred filler materials. Other filler materials which may be used include metal oxides such as ceria (S.G. about 7.3) and niobia, metal powders such as aluminum powder (S.G. about 2.5), salts such as barium titanate (S.G. about 6) and materials such as glass microspheres (S.G. about 2.4) and the like.

A further advantage obtained by the use of fillers is that the amount of binder in the decorative composition is reduced and because the fillers are usually cheaper than the binder, the cost of the decorative composition is reduced.

It is desirable that the particle size of the filler should be below that of the required ink particle size. If the filler particles are very considerably smaller than the ink particle, then the latter may incorporate a number of such filler particles. In the case of titanium dioxide and other highly opaque white fillers, the filler may also act as a white pigment or colorant.

The actual amount of filler present in the decorative composition will depend upon the properties desired of the composition. I have found that when I use fillers with a specific gravity at least twice that of the binder, the minimum amount of filler which will give the desired increase in the specific gravity of the composition is 15% by weight based on the total weight of the composition. Generally, I prefer to use 20% to 45% of filler, on the same basis. The filler should preferably not be present in too high a proportion in the ink composition, since at very high degrees of loading it may have a weakening effect on the ultimately formed print film, and may make the latter unduly sensitive to abrasion. Generally it is preferable that the weight ratio of binder to filler should not be less than 1:1. For any particular formulation the maximum desirable filler content may vary with the nature of the filler and other factors. Where, for example, for economy reasons, it is desired to deposit thin print layers it is desirable that the particle size of the filler should be well below the desired film thickness. Thus, for films of about 0.5 mil thickness a suitable particle size is about 4 microns or less.

The antistatic agents suitable for use in the ink compositions or external application to ink particles, include myristyl dimethyl ammonium ethyl sulphate, cetyl dimethyl ethyl ammonium ethyl sulphate marketed by Guest Industrials Ltd. of London, England under the name "Querton 16ES100," the polymethoxylated quaternary ammonium salt marketed by Armour Chemicals Ltd. under the name "Ethoquad" C/25, and the antistatic agent marketed by Geigy under the name "Alromine" R.U. 100. Properties of "Alromine" are given in the Geigy booklet "Interplas 65."

Appreciable effects on the surface resistivity of the ink particles can be produced by amounts of about 15% by weight of the agent if it is incorporated in the composition; if the antistatic agent is to be applied externally to the ink particles then lower amounts may be used, in some cases as low as 2% by weight.

It is a particular feature of the method in either its solution or melt variants that it makes possible the preparation of an ink with a thermosetting binder in the B-stage. A thermosetting ink composition, for example, an epoxy resin with a curing agent for producing a B-stage compound, is used as binder, and when the ink composition has been dispersed in the inert suspending liquid as described above, the heating temperature and time are so adjusted that the binder is converted to the B-stage in the individual particles of the dispersion.

In order that the invention may be more fully understood, reference is made to the following examples which represent some of the best modes contemplated in the practice of this invention.

Example 1

"Piccolastic" D 100 resin (blend of different molecular weight fractions of polystyrene, produced by the Pennsylvania Industrial Chemical Corporation) 32 parts by weight, was compounded in the usual way on a heated 2-roll mill with 30 parts by weight of titanium dioxide of mean particle size 0.25 microns, 0.9 parts by weight of a red soluble colorant "Waxolene" Red (OS–I.C.I. Ltd.), and 15 parts by weight of myristyl dimethyl ethyl ammonium ethyl sulphate.

After a homogeneous composition had been obtained, in which all the dye was dissolved in the resin and the filler dispersed uniformly (with no visible agglomerates remaining) throughout the composition, the latter was melted at about 110° C. Glycerol (about 10 times the volume of the molten composition) was placed in a stainless steel vessel equipped with an impeller stirrer immersed down to about half the depth of the liquid. This bath was heated to a temperature of about 150° C. and the stirrer set in motion at 1500–2000 r.p.m. No special effort was made to establish the optimum ratio of impeller diameter to the capacity and size of the vessel. However, the conditions used, viz vessel diameter equal to 1.5 times the impeller diameter and the depth of the glycerol 1 to 1.5 times the diameter of the impeller, were found to be suitable in practice. The fluid melt was introduced gradually into the glycerol bath, by pouring into the vortex produced by the rotating stirrer. After all the melt had been introduced the stirrer was kept rotating and the temperature of the glycerol was gradually lowered to room temperature by first removing the heat source and then cooling on a water bath. This part of the operation occupied about 1 hour. The stirring was discontinued, and the suspended particles (now solid) of the ink composition were separated from the suspending liquid, and washed with water until substantially free from glycerol. At that stage a few samples were taken and examined under the microscope. It was found that the particles were spherical in shape and of uniform size of between 80 and 100 microns. After the washing had been completed enough water was left in with the particles to give a suspension with a solid to liquid ratio (by volume) of about 3:7. This was further diluted as required for the optimum drying conditions, and dried on a Kestner Laboratory spray-dryer to produce a free-running dry powder ink. When deposited in a thin layer (about 0.5 mils thick) on cardboard and passed under a low gas flame (so that the flame touched the surface for about 1 second) the ink was found to fuse rapidly into a coherent film adhering well to the cardboard.

Example 2

100 parts by weight of polyamide resin, "Versamid" 940-(General Mills) was dissolved in twice its own weight of 1:1 toluene/n-butanol mixture. The following were then thoroughly dispersed in the solution to produce an agglomerate-free dispersion:

| | Parts by weight |
|---|---|
| Titanium dioxide | 100 |
| Yellow pigment (Chrome Yellow Medium-DuPont) | 20 |
| Diatomaceous Silica ("Aerosil") | 5 |

A bath consisting of water containing 5% of polyvinyl alcohol and 0.5% by weight of "Ethoquad" C12 was prepared in the same manner as the bath of glycerol in Example 1, but was not heated prior to the introduction of the binder solution with its dispersed additive. The amount of water-polyvinyl alcohol-"Ethoquad" C12 bath used was about 7 parts to 1 part by volume of the solution with the suspended dispersed solids. The mixing conditions were as in Example 1. The stirrer was set in motion and the solution introduced gradually over a period of about ten minutes into the vortex formed in the bath. After the addition of the solution had been completed the bath was heated gradually over a period of about one-half hour to the temperature of 65° C. and maintained at this temperature with continuous stirring for about four hours after which time all the solvent had been stripped off. Heating was then discontinued while the stirring was maintained and the bath was cooled down to room temperature. The solid ink particles produced in suspension by the method described were separated out and washed as in Example 1. In the final stage of the washing, the particles formed a suspension of about 1:2 by volume in water after which 1.5% of "Ethoquad" C12 (on the total weight of all solids used in the ink formulation) was added to the suspension and the ink was spray-dried as in Example 1. The resulting dry powder ink consisted of spherical particles of uniform particle size (about 5–15 microns). The particles carried on the surface a uniform, very thin coating of polyvinyl alcohol containing the anti-static agent. When deposited in a thin layer (about 0.5 mil thick) on cardboard and passed under a low gas flame (so that the flame touched the surface for about one second) the ink was found to fuse rapidly into a coherent film adhering well to the cardboard.

Example 3

The following thermoplastic ink was produced by a variant of the solution method of Example 2.

| | Parts by weight |
|---|---|
| "Piccolastic" D100 | 100 |
| "Querton" 16ES100 | 20 |
| Titanium Dioxide | 80 |
| Blue dye ("Grasol" Fast blue 2GLN) | 4 |

A solution was made of the resin, dyestuff and antistatic agent in xylene (1:2 resin to solvent ratio), and the titanium dioxide was dispersed in this as in Example 2. The ink was then produced from the solution containing the dispersed filler by the general method of Example 1, but the temperature of the glycerol bath was raised to 150° C., and the xylene was stripped off at this temperature. In view of the internal addition of the antistatic agent, no external addition in the final stages of washing was made as was done in Example 2. The ink was spray-dried as in Example 2. It was a free-flowing powder of spherical particle shape, with a particle size of between 5 and 15 microns diameter. When deposited in a thin layer (about 0.5 mil thick) on cardboard and passed under a low gas flame (so that the flame touched the surface for about 1 second) the ink was found to fuse rapidly into a coherent film adhering well to the cardboard.

Example 4

A binder solution was prepared exactly as in Example 2, but with methylene chloride as solvent. The following were then dispersed in the solution to produce an agglomerate-free dispersion:

| | Parts by weight |
|---|---|
| Titanium dioxide | 80 |
| Diatomaceous Silica ("Aerosil"-Bush Beach and Segner Bayley) | 5 |
| Red Colorant ("Rubine" Toner-I.C.I. Ltd.) | 10 |

The colorant and fillers were added in the way described in Example 2. A 6% by weight solution of polyvinyl alcohol in water was prepared and the resin solution with the dispersed solids was dispersed therein with stirring, essentially as described in Example 2. The removal of solvent, by heating the dispersion with stirring, was again analogous to that in Example 2, but the temperature of the dispersing liquid (aqueous solution of polyvinyl alcohol) was raised only to 60° C. When all the solvent had been removed, the dispersion bath was cooled to room temperature. The solid phase was then washed with water, by repeated dilutions, until substantially all the thickening agent had been removed. Enough water was left in with the solid phase at the end of the washing operation to give a suspension suitable for spray-drying. At this stage "Querton" 16ES 100 was added in quantity equal to 4% of the weight of the particulate ink solids in the suspension, and the latter was thoroughly stirred. The suspension was then dried as in the previous examples. The resulting dry powder ink consisted of spherical particles of about 5-15 microns in size. When deposited in a thin layer (about 0.5 mil thick) on cardboard and passed under a low gas flame (so that the flame touched the surface for about 1 second) the ink was found to fuse rapidly into a coherent film adhering well to the cardboard.

It will be obvious to those skilled in the art that other embodiments and modifications hereof can be made within the scope and spirit of this invention.

I claim:
1. A process for preparing resin-based, decorative, electrostatic spherical particles which comprises
   (a) dissolving a selected resin in a solvent to form a solution;
   (b) mixing said solution of resin dissolved in solvent with a liquid which is a non-solvent relative to the resin to form a dispersion, said non-solvent being immiscible with the resin solvent and having a higher boiling temperature than said solvent and the ratio by volume of said non-solvent to said solvent being as least 5:1;
   (c) heating and agitating the dispersion so as to evaporate the solvent and thus form substantially spherical particles consisting essentially of the selected resin dispersed in the non-solvent liquid;
   (d) and then spray drying said dispersion so as to recover said spherical particles.
2. A process as claimed in claim 1 wherein said resin is a thermoplastic resin.
3. A process as claimed in claim 1 wherein said resin is a partially uncured thermosetting resin capable of fusion.
4. A process as claimed in claim 3 wherein said partially uncured thermosetting resin is an apoxy resin, a phenol/formaldehyde resin or an acrylic resin.
5. A process as claimed in claim 3 wherein said partially uncured thermosetting resin is a diglycidyl ether of bisphenol A, a glycidyl ether of glycerol, a glycidyl ether of bisphenol P, a glycidyl ether of tetrakis ethane, a long chain bisphenol ether of tetrakis ethane or an epoxylated nonolac.
6. A process as claimed in claim 1 wherein said non-solvent is glycerol and said solvent is toluene or xylene.
7. A process as claimed in claim 1 wherein said non-solvent is water and said solvent is methylene chloride or chloroform.
8. A process as claimed in claim 1 wherein said non-solvent is water containing up to 6% of a thickening agent taken from the group consisting of polyvinyl alcohol and carboxymethyl cellulose.
9. A process as claimed in claim 8 wherein said thickening agent forms a film on the surface of said spray dried spherical particles.
10. A process as claimed in claim 1 wherein said dispersion is agitated until said solvent is evaporated.
11. A process as claimed in claim 2 wherein said thermoplastic resin is polyvinyl chloride, polyvinylidene chloride, polyethylene, polystyrene or a copolymer of vinyl acetate and ethylene.
12. A process as claimed in claim 2 wherein said thermoplastic resin is a polyacrylate, a melamine formaldehyde resin, an organopolysiloxane resin, an aldehyde resin, a ketone resin or a polyamide resin.
13. A process as claimed in claim 12 wherein said polyamide resin has an acid value of about 3 to 5, an amine value of about 1 to 8.5, and a specific gravity of about 0.92 to 0.99.
14. A process as claimed in claim 12 wherein said polyamide resin is the condensation product of ethylenediamine and sebacic acid, propylenediamine and sebacic acid, tetramethylenediamine and adipic acid, tetramethylenediamine and suberic acid, pentamethylenediamine and malonic acid, pentamethylenediamine and adipic acid, octamethylenediamine and sebacic acid, or decamethylenediamine and oxalic acid.
15. A process as claimed in claim 1 further comprising the step of adding a colorant to said solution of resin dissolved in solvent.
16. A process as claimed in claim 15 wherein up to 20% by weight of colorant based on the total weight of said spherical particles is added.
17. A process as claimed in claim 15 wherein said colorant is carbon black.
18. A process as claimed in claim 1 further comprising the step of adding a filler to said solution of resin dissolved in solvent.
19. A process as claimed in claim 18 wherein at least 15% by weight of filler based on the total weight of said spherical particles is added.
20. A process as claimed in claim 19 wherein 20-45% by weight of filler based on the total weight of said spherical particles is added.
21. A process as claimed in claim 2 further comprising the step of adding a filler to said solution of thermoplastic resin dissolved in solvent, the weight ratio of thermoplastic resin to filler being at least 1:1.
22. A process as claimed in claim 21 wherein the specific gravity of said filler is at least twice the specific gravity of said thermoplastic resin.
23. A process as claimed in claim 21 wherein the specific gravity of said filler is at least four times the specific gravity of said thermoplastic resin.
24. A process as claimed in claim 21 wherein said filler is silica, titanium dioxide, ceria, niobia, aluminum powder, barium titanate or glass microspheres.
25. A process as claimed in claim 1 further comprising the step of adding an antistatic agent to said solution of resin dissolved in solvent.
26. A process as claimed in claim 25 wherein said antistatic agent is myristyl dimethyl ammonium ethyl sulphate or cetyl dimethyl ethyl ammonium ethyl sulphate.

References Cited
UNITED STATES PATENTS 3,326,848  6/1967  Clemens et al. _____ 260—41

MORRIS LIEBMAN, Primary Examiner

H. H. FLETCHER, Assistant Examiner

U.S. Cl. X.R.

262—62.1; 260—25, 13, 29.2 R, 33.4 R, 33.4 EP, 33.45 B, 33.4 PQ, 33.6 R, 33.6 EP, 33.6 PQ, 33.6 SB, 33.6 UA, 33.8 R, 33.8 EP, 33.8 UA, 34.2, 37 N, 37 SB, 37 EP, 38, 39 R, 41 R, 47 EP, 57 R, 63 R, 78 R, 86.1 E, 85.7, 87.5 R, 87.7, 93.5 R, 94.9 R, 836, 844